Figure 5:
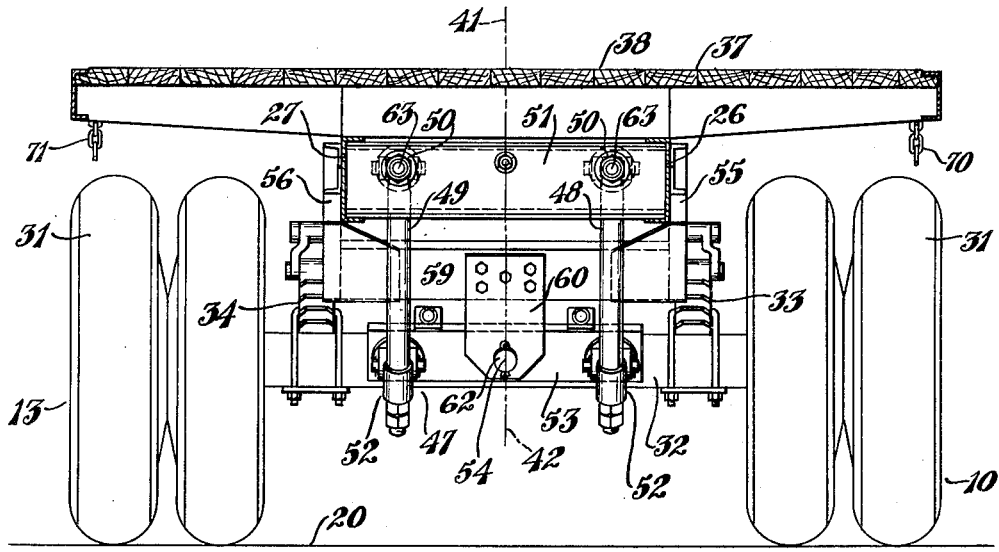

Aug. 12, 1941.   O. I. OYLER   2,252,135
WHEEL VEHICLE TRAIN, UNIT, AND CONNECTION
Filed June 19, 1940   3 Sheets-Sheet 1
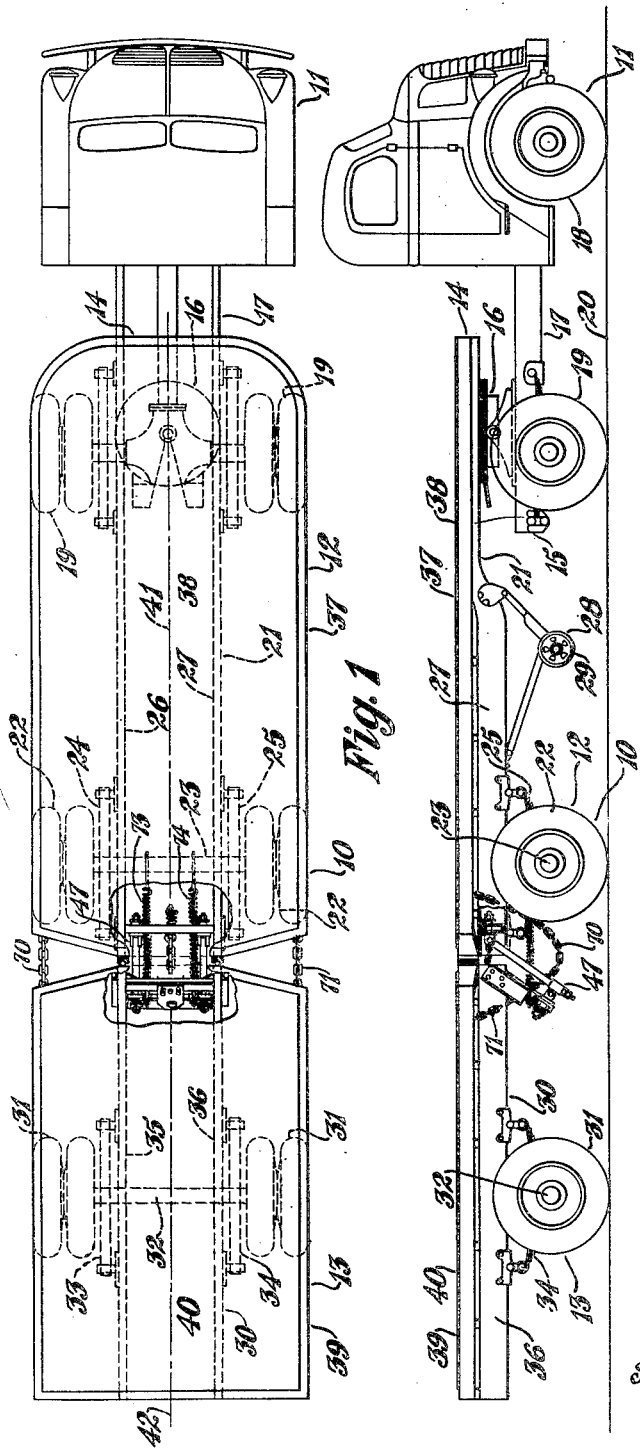
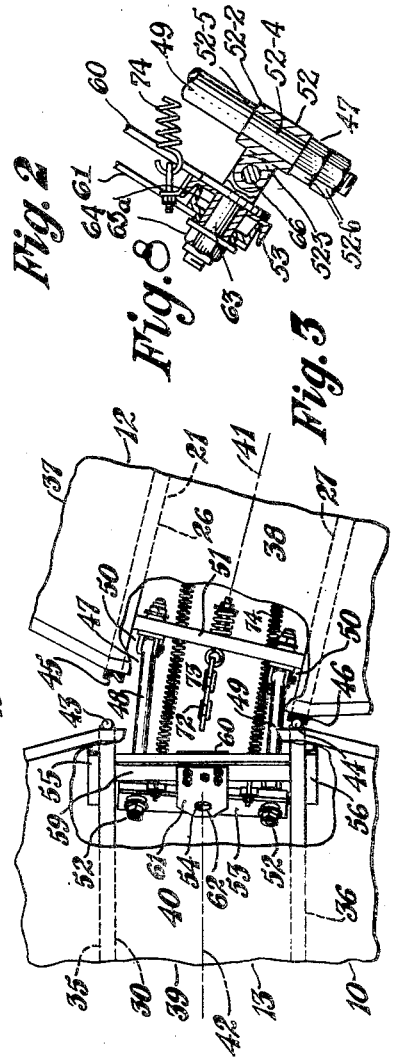
Inventor
Otto I. Oyler
By Frease and Bishop
Attorneys Aug. 12, 1941.  O. I. OYLER  2,252,135
WHEEL VEHICLE TRAIN, UNIT, AND CONNECTION
Filed June 19, 1940  3 Sheets-Sheet 2

Inventor
Otto I. Oyler
By Freose and Bishop
Attorneys

Aug. 12, 1941.  O. I. OYLER  2,252,135
WHEEL VEHICLE TRAIN, UNIT, AND CONNECTION
Filed June 19, 1940  3 Sheets-Sheet 3

Otto I. Oyler

Patented Aug. 12, 1941

2,252,135

UNITED STATES PATENT OFFICE 2,252,135

WHEEL VEHICLE TRAIN, UNIT, AND CONNECTION

Otto I. Oyler, Canton, Ohio

Application June 19, 1940, Serial No. 341,329

14 Claims. (Cl. 280—33.2)

My invention relates in general to articulated vehicle trains, units, and connections; and more particularly to highway transport vehicle trains including a motor tractor or truck and one or more trailers; and the present invention is a continuation in part of the common subject matter set forth in my prior application for U. S. Letters Patent for Wheel vehicle trains, units, and connections, filed October 17, 1939, Serial No. 299,825.

A commonly used highway transport vehicle train includes a four wheel tractor, a two wheel trailer, called in the trade a semi-trailer, and having a fifth wheel load transmitting connection with the four wheel tractor, and a four wheel trailer having a draw bar connection with the two wheel trailer.

A usual four wheel trailer includes an upper load carrying frame, a pair of rear wheels on an axle below and spring connected with the frame, and a pair of front wheels and an axle below and having a fifth wheel connection with the frame so that the front wheels and their axle may turn about the central upright axis of the fifth wheel.

The maximum gross load of a highway transport vehicle train is fixed by law in many States, and thus the possible pay load of any particular vehicle train is the difference between the allowable gross load and the total weight of the several vehicle units of the train.

In a four wheel trailer unit, not only does the weight of the front wheels, front axle, and fifth wheel detract from the possible pay load as compared with a two wheel trailer, but also the usual draw bar connection of a four wheel trailer with the vehicle unit to which it is connected requires a substantial clearance between the adjacent ends of the connected vehicle units in order to permit relative turning of the units.

Moreover the wheels of a usual four wheel trailer do not track the wheels of the preceding vehicle unit to which it is connected, causing difficulties in turning a train having a four wheel trailer, particularly in close quarters.

On the other hand, two wheel highway transport trailers have usually had a fifth wheel connection with a tractor, and have not been connected with another trailer, among other reasons because of the relatively heavy weight of a fifth wheel connection.

The objects of the present invention include the provision of an improved preferably highway transport vehicle train including a plurality of vehicle units end connected with each other for permitting turning of each unit with respect to the unit or units to which it is connected, and in which at least one of the vehicle units is a two wheel unit having its front end connected with the rear end of the next preceding unit so as to permit abutment of parts at the front end of the two wheel trailer unit with parts at the rear end of the next preceding vehicle unit and at the same time permit relative turning of the two units.

Further objects of the present invention include the provision of such an improved preferably highway transport vehicle train with improved connecting coupling or hitch means between the units having end abutting parts.

Further objects of the present invention include the provision of an improved preferably highway transport vehicle train adapted for simplified and economical production and for economical operation and maintenance.

The foregoing and other objects are attained by the vehicle train, units, parts, combinations, and sub-combinations, which comprise the present invention and the nature of which is set forth in the following general statement and preferred embodiments of which together with their mode of use are set forth by way of example in the following description, and which are particularly and distinctly pointed out and set forth in the appended claims forming part hereof.

The nature of the present invention may be stated in general terms as including in a preferably highway transport vehicle train, a first vehicle unit and a second vehicle unit, the vehicle units having longitudinal center planes and adjacent ends, each vehicle unit including an upper load carrying preferably rectangular frame, one or more frame parts at one end of the second unit abutting one or more frame parts of the adjacent end of the first vehicle unit, the second vehicle unit having two laterally spaced preferably coaxial wheels operatively mounted on and below the frame and its longitudinally extending center plane being between the wheels and at right angles to an upper flat plane which is preferably the loading plane of the unit, and means operatively connecting the adjacent frame ends for permitting turning of the frames with respect to each other about laterally spaced axes between the abutting frame ends and on opposite sides of the center planes.

The connecting means include laterally spaced preferably rigid inclined members on opposite sides of the center planes, the inclined members being angled with respect to the loading plane and the upper ends of the inclined members being adjacent the first vehicle unit and the lower ends of the inclined members being adjacent the second vehicle unit, a cross lever operatively mounted on the second vehicle unit for pivoting about an axis in its center plane and preferably at right angles to a plane including the longitudinal axes of the inclined members when the center planes of the units are alined with each other, bendable and twistable joint means connecting the upper end of each inclined member with the first vehicle unit, and bendable and twistable joint means connecting the lower end of each inclined member with the cross lever on the second vehicle unit at one side of the center planes.

The center of gravity of the second vehicle unit is located between the axis of rotation of its wheels and its connected end, whereby there is always a torque tending to swing the connected end of the second vehicle unit frame downwardly, the angled inclined connecting members resisting this torque and producing component forces causing the abutment of one or more sets of opposed frame parts against each other on the adjacent connected ends of the units.

One set of opposed frame parts abut each other at one side of the center during turning, and preferably two sets of opposed frame parts abut each other during straight forward or backward movement of the train.

In loading the second vehicle unit, care is taken to position the center of gravity of the load likewise between the axis of rotation of the wheels of the second vehicle unit and its connected end to augment the component forces urging the abutment against each other of the opposed frame parts on the adjacent connected ends of the units.

Preferably, one or more tension springs of suitable capacity connect the adjacent and connected ends of the units to resiliently resist separation of the abutting parts particularly in starting when the first vehicle unit moves in the forward direction and pulls the second vehicle unit.

Figure 4:
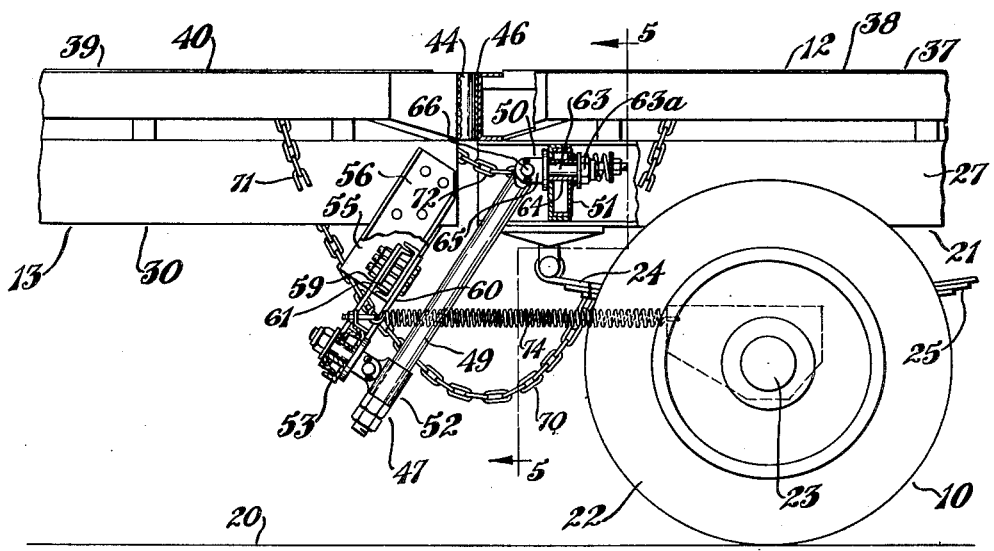
Figure 7:
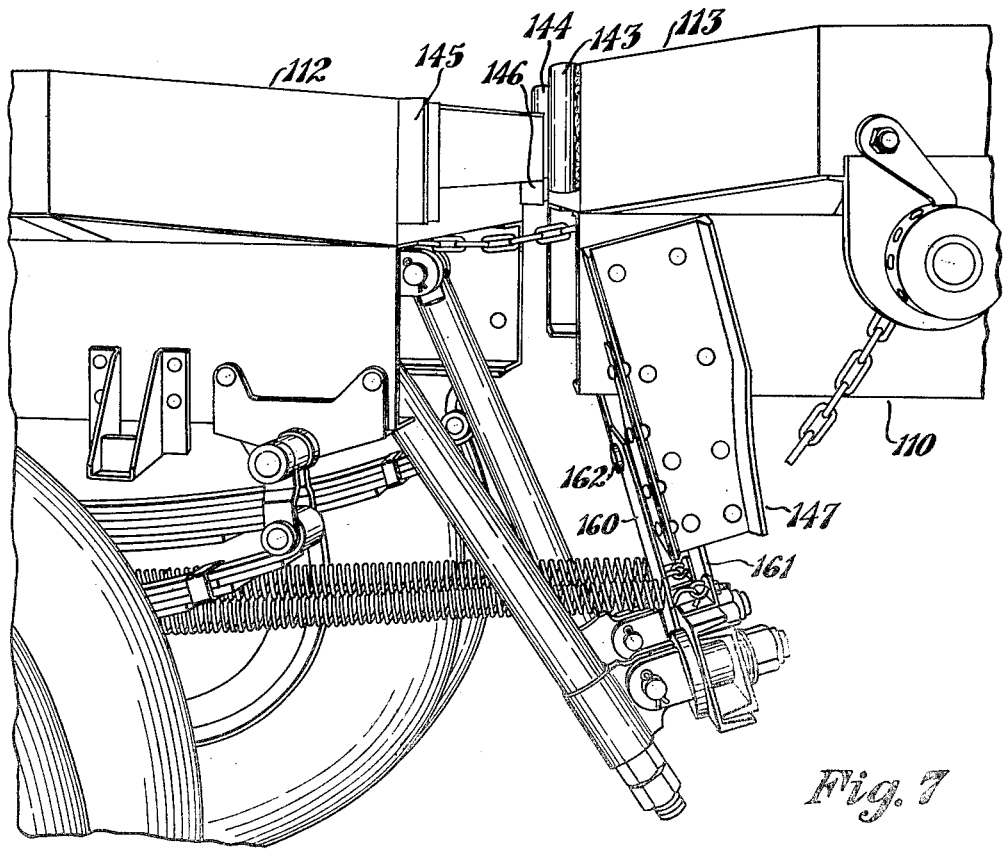
Figure 6:
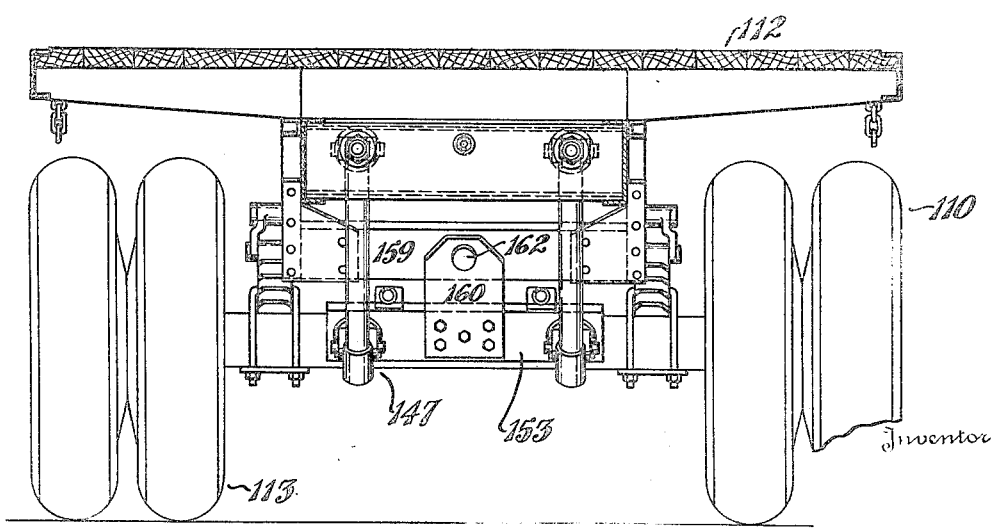

By way of example, embodiments of the improved vehicle train and the units and parts thereof are illustrated in the accompanying drawings forming part hereof, in which Figure 1 is a top plan view of a highway transport vehicle train, including one embodiment of the present improvements, with portions of the frames and floors of connected units thereof broken away to clearly illustrate the details of the improved connecting means, the units of the train and their parts, and the improved connecting means and parts thereof connecting two of the train units being shown in their respective positions when the train is moving straight forward;

Fig. 2, a side elevation thereof with portions broken away;

Fig. 3, an enlarged fragmentary view with portions removed showing the trailer units of the train of Figs. 1 and 2 and the improved connecting means thereof after turning of the units about one side axis of turn;

Fig. 4, an enlarged fragmentary view with portions broken away similar to Fig. 2 showing details of the improved connecting means;

Fig. 5, a transverse sectional view thereof as on line 5—5, Fig. 4;

Fig. 6, a view similar to Fig. 5 showing a second embodiment of the present improvements;

Fig. 7, a fragmentary side elevation view thereof showing the relative positions of the parts in negotiating a turn; and Fig. 8, an enlarged fragmentary sectional view illustrating details of one of the swivel and hinge and swivel joint means included in lower portions of the improved connecting means of the present invention.

Similar numerals refer to similar parts throughout the several views.

A wheel vehicle train including one embodiment of the present improvements is indicated generally at 10 in Figs. 1 to 5 inclusive, and as shown includes three articulated end connected vehicle units, which are a four wheel automotive tractor unit indicated generally by 11, a first two wheel trailer unit indicated generally by 12, and a second two wheel trailer unit indicated generally by 13.

Front end parts 14 of the first two wheel trailer unit, or semi-trailer 12 are operatively connected in a usual manner with rear end parts 15 of the tractor unit 11 as by usual fifth wheel means indicated generally by 16, so that the tractor unit 11 including the longitudinally extending frame 17 supported in a usual manner by spring mounted front wheels 18 and spring mounted rear wheels 19 may turn laterally about the upright central pivot of the fifth wheel 16 on the highway or other supporting surface 20 upon which the train 10 is operating.

The semi-trailer 12 includes a longitudinally extending frame indicated generally by 21, and the front end parts 14 and rear end parts 15 of the semi-trailer 12 and tractor 11 between which the fifth wheel 16 is interposed, are preferably parts of the semi-trailer frame 21 and tractor frame 17 respectively. Below the frame 21, the semi-trailer 12 includes laterally spaced preferably coaxial double wheels 22, as shown operatively mounted on opposite ends of a common axle 23 which supports the frame 21 on the wheels 22 as shown by laterally spaced leaf spring means 24 and 25 operatively interposed respectively between the axle 23 and longitudinally extending laterally spaced side members 26 and 27 of the frame 21.

Usual retractable landing carriage means indicated generally by 28 are preferably operatively mounted below and on the frame 21 between the wheels 22 of the semi-trailer 12 and the front end parts 14 thereof, so that from the retracted position shown in Fig. 2, the wheels 29 of the landing carriage means 28 may be lowered into contact with the supporting surface 20, for holding up in a usual manner the front end of the semi-trailer 12 when the tractor unit 11 is disconnected therefrom.

The second two wheel trailer unit, or semi-trailer 13 includes an upper longitudinally extending frame indicated generally by 30, below which laterally spaced preferably coaxial double wheels 31 are operatively mounted on opposite ends of a common axle 32 which supports the frame 30 on the wheels 31 as shown by laterally spaced leaf spring means 33 and 34 operatively interposed respectively between the axle 32 and longitudinally extending laterally spaced side members 35 and 36 of the frame 30.

The frame 21 of the semi-trailer 12 supports on its top a longitudinally extending floor structure indicated generally by 37 preferably having a flat upper surface 38 which may be termed the loading plane of the semi-trailer 12. Similarly the frame 30 of the semi-trailer 13 supports on its top a longitudinally extending floor structure indicated generally by 39 preferably having a flat upper surface 40 which may be termed the loading plane of the semi-trailer 13.

The semi-trailer 12 has a longitudinally extending center plane indicated by the dot-dash line 41 at right angles to its loading plane 38 and midway between and parallel with the longitudinally extending parallel side frame members 26 and 27 and midway between the laterally spaced double wheels 22. Similarly the semi-trailer 13 has a longitudinally extending center plane indicated by the dot-dash line 42 at right angles to its loading plane 40 and midway between the longitudinally extending parallel side frame members 35 and 36 and between the laterally spaced double wheels 31.

In the improved train 10, front end parts 43 and 44 of the semi-trailer 13 are abuttable respectively against rear end parts 45 and 46 of the semi-trailer 12. Improved connecting means indicated generally by 47 operatively connect the adjacent front and rear ends of the semi-trailers 13 and 12 with each other, so that the semi-trailers 12 and 13 may turn laterally with respect to each other alternately about axes on opposite sides of the center planes 41 and 42, each side axis of turn being preferably perpendicular to the loading planes 38 and 40 of the semi-trailers 12 and 13.

The improved connecting means 47 includes two preferably rigid inclined members 48 and 49 each laterally offset from the center planes 41 and 42. Preferably hinge and swivel joint means each indicated generally by 50 connect the upper ends of the members 48 and 49 with rear end parts of the semi-trailer 12, preferably as shown with a laterally extending cross frame member 51 having its opposite ends connected with the laterally spaced side frame members 26 and 27.

Swivel and hinge and swivel joint means each indicated generally by 52 connect the lower ends of the inclined members 48 and 49 with parts on the forward end of the semi-trailer 13. As shown and preferably the joint means 52 include members connected at opposite ends of a cross lever member 53, which as shown and preferably is pivotally connected with the frame 30 of the semi-trailer 13, the axis of pivoting 54 of the cross lever member 53 being preferably in the center plane 42 of the semi-trailer 12 and preferably at an angle with the loading plane 40 thereof and at right angles with the plane including the longitudinal axes of the inclined members 48 and 49 when the center planes 41 and 42 of the semi-trailers 12 and 13 are alined with each other for straight forward or backward movement of the train 10.

For effecting the pivotal connection of the cross lever member 53 with the frame 30 of the semi-trailer 13, as shown, adjacent the front end of the semi-trailer 13 side struts 55 and 56 are connected at their upper ends respectively with the side frame members 35 and 36 and extend downwardly and rearwardly therefrom preferably at equal angles therewith.

A cross member 59 extends laterally between and is connected with the struts 55 and 56.

Yoke plates 60 and 61 are secured as by bolt and nut means upon the opposite front and rear sides of the cross member 59 and depend downwardly therefrom, and the cross lever member 53 extends between the lower end portions of yoke plates 60 and 61, and a preferably removable pivot pin 62 having the pivoting axis 54 extends through suitable registering apertures of the yoke plates 60 and 61 and the cross lever member 53.

Each hinge and swivel joint means 50 as shown includes a shouldered and threaded swivel shank 63 removably secured in a bearing sleeve 64 in the cross member 51 as by a nut 63a screwed on the threaded end of the shank 63. The other end of each shank 63 is in the form of a hinge yoke 65 having apertured arms between which is located the apertured upper end of one of the inclined members 48 and 49, the apertured arms and end being hinge connected by a pin 66. The swivel axis of each shank 62 is parallel with the center plane 41 of the semi-trailer 12, and the hinge axis of each pin 66 is perpendicular to the swivel axis.

Each swivel and hinge and swivel joint means 52 is similar to one of the hinge and swivel joint means 50 with the addition of a swivel connection with the lower end of one of the inclined members 48 and 49.

Each swivel and hinge and swivel joint means 52 as shown includes parts as set forth for each hinge and swivel joint means 50, and in addition each joint means 52 includes a cylindric sleeve 52—2 having at one side an apertured ear 52—3 hinge connected by its pin 66 with its yoke 65.

Each cylindric sleeve 52—2 has swivel fitted therein the shouldered and threaded reduced lower end 52—4 of one of the inclined members 48 and 49. As best shown in Figs. 4 and 8, the shoulder 52—5 of the lower end 52—4 of each inclined member seats against the upper end of the sleeve 52—2 in which the lower end 52—4 is swivel fitted, and the threaded extremity of each lower end 52—4 extends below its sleeve 52—2, and nuts 52—6 are screwed on the threaded extremity, the upper nut 52—6 seating against the lower end of the sleeve 52—2 and the lower nut 52—6 serving as a lock nut, whereby relative endwise movements of the sleeves 52—2 on the inclined members 48 and 49 are prevented.

The preferably rigid inclined members 48 and 49 are thus connected between the rear frame member 51 of the frame 21 of the semi-trailer 12 and the pivoted cross lever member 53 of the frame 30 of the semi-trailer 13.

Each hinge and swivel joint means 50 and each swivel and hinge and swivel joint means 52 also may be termed bendable and twistable joint means. Thus there may be said to be a bendable and twistable joint between each end of each preferably rigid inclined member 48 and 49 and the adjacent trailer unit frame member.

The center of gravity of the semi-trailer 13 is preferably between the axle 32 and the connecting means 47, so that the front end parts 43 and 44, which as shown are cylindric bars on the front end of the frame of the floor structure 39 whose axes are perpendicular to the loading plane 40, are urged towards the rear end parts 45 and 46 which as shown are rearwardly opening angle bars on the rear end of the frame of the floor structure 37 of the semi-trailer 12. The angle bars 45 and 46 may be otherwise termed members having outwardly opening grooves.

The operation of the improved connecting means and the semi-trailers 12 and 13 is such that when the center planes 41 and 42 are alined with each other as in forward movement of the train 10, the bars 43 and 44 abut against the grooves of the angle bars 45 and 46.

In turning, the first semi-trailer 12 laterally swings on either of the angle bars 45 or 46 pivoting respectively on the cylindric bar 43 or 44, the axis of turn being the longitudinal axis of the particular bar 43 or 44, laterally offset from the center planes 41 and 42.

In making a right forward turn as shown in Fig. 3, the angle bar 46 pivots on the bar 44, and the angle bar 45 swings away from the bar 43, and the inclined connecting member 48 swings up elevating the end of the cross lever member 53 which is connected with the inclined connecting member 48 and fulcruming the cross lever member 53 on the joint means 52 at the lower end of the inclined connecting member 49, thereby elevating the pivot pin 62 and the front end of the semi-trailer 13 bearing upon the pivot pin 62 through the struts 55 and 56, and the cross member 59 and the yoke plates 60 and 61.

The elevating or lifting of the front end of the pulled semi-trailer 13 causes an upward sliding of bar 44 in the angle bar 46, as well as a pivoting of the angle bar 46 on the bar 44, in making a right forward turn.

In making a left forward turn reverse movements of the associated parts take place.

When it is desired to back the train 10, the semi-trailers 12 and 13 are preferably tightly connected with each other to prevent turning as by chains 70 and 71 extending on opposite sides of the center planes 40 and 41 between the adjacent connected ends of the trailers 12 and 13, the chains 70 and 71 being shown in the drawings with a usual amount of slack for forward movement of the train 10.

The chains 70 and 71 also serve as safety chains and as limits for the angle of turn in either direction of the semi-trailers 12 and 13 with respect to each other.

Preferably, a center safety chain 72 is connected between the rear end of the semi-trailer 12 and the front end of the semi-trailer 13 for preventing the front end of the semi-trailer 13 and the bars 43 and 44 to ride above the loading plane of the semi-trailer 12 and the upper ends of the angle bars 44 and 45.

Laterally spaced longitudinally extending tension springs 73 and 74 are also preferably connected between the cross lever member 53 and the axle 23 of the semi-trailer 12 for aid in starting by resiliently resisting separation of the abutting parts of the semi-trailers 12 and 13 and avoiding bumping of the abutting parts.

When the semi-trailer 13 is not loaded, the preferred location of its center of gravity between the axle 32 and the connecting means 47 results in a tendency of the connected end of frame 30 of the semi-trailer 13 to swing downwardly against the resistance of the inclined members 48 and 49 producing component forces urging abutment of one or both sets of opposite parts 43 and 45, and 44 and 46, both sets abutting in straight forward or backward movement of the connected semi-trailers 12 and 13, and one of the sets abutting during turning.

If the center of gravity of the semi-trailer 13 is not located between the axle 32 and the connecting means 47, then the tension springs 73 and 74 must be strong enough to cause the abutment of the sets of opposite parts 43 and 45, and 44 and 46.

In loading the semi-trailer 13, the center of gravity of the load is located between the axle 32 and the connecting means 47 for augmenting the component forces causing the abutment of the sets of opposite parts 43 and 45, and 44 and 46.

In starting the train 10, the initial tendency of the semi-trailer 12 to separate from abutment with the semi-trailer 13 is overcome by the springs 73 and 74. After the train 10 is in motion, the operation of the semi-trailers 12 and 13 and their connecting means 47 is as described in the foregoing.

The use of the preferred rigid inclined members 48 and 49, combined with the use of the two laterally spaced sets of separable interfitting opposite parts 43 and 45, and 44 and 46, abuttable and pivotal against each other on the adjacent ends of the semi-trailers 12 and 13, provides for positive control of the turning action of the semi-trailers 12 and 13 with respect to each other, and for tracking of the rear semi-trailer 13 with respect to the forward semi-trailer 12.

The train 110 including a second embodiment of the present improvements is illustrated in Figs. 6 and 7 and includes a semi-trailer 112 having its rear end adjacent the front end of a semi-trailer 113, the semi-trailer 112 having laterally spaced rearwardly opening angles 145 and 146 adapted for alternate abutment and pivoting on laterally spaced cylindric bars 143 and 144 secured on the front end of the semi-trailer 113.

The adjacent rear and front ends of the semi-trailers 112 and 113 are connected by improved means 147 which are generally similar to the connecting means 47 of the train 10, with the exception that in the connecting means 147 the pivot pin 162 is secured in the cross member 159 pivoting the upper ends of the yoke plates 160 and 161, the lower ends of which are connected by bolt and nut means with the cross lever member 153.

The operation of the connecting means 147 is substantially the same as the operation of the connecting means 47.

Fig. 7 clearly shows how the front end of the pulled semi-trailer 113 is elevated during turning by the operation of the improved connecting means 147.

In each of the improved vehicle trains 10 and 110, the use of two semi-trailers connected with each other by the novel means above set forth provides for a greater possible pay load than if a semi-trailer and trailer are used, and with less overall length of the train.

The embodiments of the present invention illustrated and described herein are by way of example, and the scope of the invention is not limited to the same or to the particular details thereof, but is commensurate with any and all novel subject matter contained herein which may at any time properly under the United States patent laws be set forth in the claims hereof or originating herein, and the elements of any such claims are intended to include their functional or structural equivalents.

I claim:

1. In a vehicle train, a first vehicle unit and a second vehicle unit, the vehicle units having longitudinal center planes and adjacent ends, and means operatively connecting the adjacent ends of the vehicle units for alternate lateral turning of the units with respect to each other about axes on opposite sides of the center planes and between the connected ends, the connecting means including laterally spaced rigid inclined members on opposite sides of the center planes, the inclined members having upper ends adjacent the first vehicle unit and lower ends adjacent the second vehicle unit, a cross lever operatively mounted on the second vehicle unit for pivoting about an axis in its center plane, bendable and twistable joint means connecting the upper end of each inclined member with the first vehicle unit, and bendable and twistable joint means connecting the lower end of each inclined member with the cross lever on the second vehicle unit at one side of the center planes.

2. In a vehicle train, a first vehicle unit and a second vehicle unit, the vehicle units having longitudinal center planes and adjacent ends, and means operatively connecting the adjacent ends of the vehicle units for alternate lateral turning of the units with respect to each other about axes on opposite sides of the center planes and between the connected ends, the connecting means including two upwardly and downwardly inclined rigid bars each laterally offset from the center planes, angularly movable means connecting the upper ends of the inclined bars with the first vehicle unit and means connecting the lower ends of the inclined bars with the second vehicle unit and permitting swinging of the inclined bars, the second vehicle unit including a single set of laterally spaced lower supporting wheels operatively mounted on the unit for rotation about a single axis extending at right angles with its center plane, and the center of gravity of the second vehicle unit being between the wheel axis and the connecting means, whereby the parts of the second vehicle unit above the supporting wheels tend to swing the connected end downwardly against the resistance of the upwardly and downwardly inclined bars, and the adjacent ends of the units including laterally spaced sets of opposite end parts, each set of opposite end parts being abuttable against each other on one of the axes of lateral turning.

3. In a vehicle train, a first vehicle unit and a second vehicle unit, the vehicle units having longitudinal center planes and adjacent ends, and means operatively connecting the adjacent ends of the vehicle units for alternate lateral turning of the units with respect to each other about axes on opposite sides of the center planes and between the connected ends, the connecting means including laterally spaced rigid upwardly and downwardly inclined members on opposite sides of the center planes, bendable and twistable joint means connecting the upper ends of each inclined member with the first vehicle unit, and means connecting the lower ends of the inclined members with the second vehicle unit and permitting swinging of the inclined members, the second vehicle unit including a single set of laterally spaced lower supporting wheels operatively mounted on the unit for rotation about a single axis extending at right angles with its center plane, and means including members on the second vehicle unit whose center of gravity is between the wheel axis and the connecting means and tending to swing the connected end of the second vehicle unit downwardly against the resistance of the upwardly and downwardly inclined members, and the adjacent ends of the units including laterally spaced sets of opposite end parts, each set of opposite end parts being abuttable against each other on one of the axes of lateral turning.

4. In a vehicle train, a first vehicle unit and a second semi-trailer unit, means operatively connecting the second semi-trailer unit with the first vehicle unit, the units having longitudinal center planes, and means operatively connecting the front end of the second semi-trailer unit with the rear end of the first vehicle unit for alternate lateral turning of the units with respect to each other about axes on opposite sides of the center planes and between the connected ends, the connecting means including laterally spaced rigid upwardly and downwardly inclined members on opposite sides of the center planes, bendable and twistable joint means connecting the upper end of each inclined member with the first vehicle unit, and means connecting the lower ends of the inclined members with the second semi-trailer unit and permitting swinging of the inclined members, the second semi-trailer unit including a single set of laterally spaced lower supporting wheels operatively mounted on the unit for rotation about a single axis extending at right angles with its center plane, and means associated with the second semi-trailer unit and tending to swing the connected end of the second semi-trailer unit downwardly against the resistance of the upwardly and downwardly inclined members, the connected ends of the units including laterally spaced sets of opposite end parts, each set of opposite end parts being abuttable against each other on one of the axes of lateral turning.

5. In a vehicle train, a first vehicle unit and a second vehicle unit, each vehicle unit including an upper load carrying frame, the frames having adjacent ends, opposite frame parts abuttable against each other on the adjacent ends of the units, the second vehicle unit having a longitudinally extending center plane and a set of laterally spaced supporting wheels operatively mounted on and below the frame for rotation about an axis, and means operatively connecting the adjacent frame ends for alternate lateral turning of the frames with respect to each other about laterally spaced axes between the adjacent frame ends and on opposite sides of the center plane, the connecting means including laterally spaced rigid upwardly and downwardly inclined members on opposite sides of the center plane, bendable and twistable joint means connecting the upper end of each inclined member with frame parts adjacent the abuttable frame parts on the first unit, and means connecting the lower ends of the inclined members with frame parts below the abuttable frame parts on the second unit and permitting swinging of the inclined members, the opposite abuttable frame end parts including laterally spaced sets of opposite frame end parts, each set of opposite frame end parts being abuttable against each other on one of the axes of lateral turning.

6. In a vehicle train, a first vehicle unit and a second vehicle unit, the vehicle units having longitudinal center planes and upper loading planes perpendicular to the center planes and adjacent ends, a lower cross lever operatively mounted for pivoting on the second vehicle unit about an axis in its center plane, the axis being perpendicular to a laterally extending plane perpendicular to the center plane and intersecting the loading plane, and means operatively connecting the cross lever with the adjacent end of the first vehicle unit, the connecting means including two inclined bars each laterally offset from the center planes and on opposite sides thereof and extending upwardly from the cross lever to the adjacent end of the first vehicle unit, each inclined bar having a hinge and swivel joint between its upper end and the first vehicle unit and having a hinge and swivel joint between its lower end and the cross lever.

7. In a vehicle train, a first vehicle unit and a second vehicle unit, the vehicle units having longitudinal center planes and upper loading planes perpendicular to the center planes and adjacent ends, a lower cross lever operatively mounted for pivoting on the second vehicle unit about an axis in its center plane, the axis being perpendicular to a laterally extending plane perpendicular to the center plane and intersecting the loading plane, and means operatively connecting the cross lever with the adjacent end of the first vehicle unit, the connecting means including two inclined bars each laterally offset from the center planes and on opposite sides thereof and extending upwardly from the cross lever to the adjacent end of the first vehicle unit, each inclined bar having a hinge and swivel joint between its upper end and the first vehicle unit and having a swivel and hinge and swivel joint between its lower end and the cross lever.

8. In a vehicle train, a first vehicle unit and a second vehicle unit having adjacent ends and loading planes, rigid bar means upwardly and downwardly inclined with respect to the loading planes and between the adjacent ends of the units, the bar means having upper and lower ends, and upper and lower means connecting the upper and lower ends of the inclined rigid bar means between the units for swinging with respect to each other and each unit when the units turn with respect to each other.

9. In a vehicle train, a first vehicle unit and a second vehicle unit having adjacent ends abuttable with each other and loading planes, rigid bar means inclined with respect to the loading planes and between the adjacent and abuttable ends of the units, and means connecting the rigid bar means between the units for swinging with respect to each unit when the units turn with respect to each other, and means associated with one of the vehicle units urging its adjacent end to swing downwardly against the resistance of the rigid bar means and to abut the adjacent end of the other vehicle unit.

10. In a vehicle train, a first vehicle unit and a second vehicle unit having adjacent ends, two laterally spaced sets of separable interfitting opposite parts abuttable and pivotal against each other on the adjacent ends of the units, each set of separable interfitting parts including an abutment and pivot member having an outwardly opening groove on one of the adjacent unit ends and an abutment and pivot bar on the other adjacent unit end, and means operatively connecting the units for turning with respect to each other on either set of interfitting parts as a pivot.

11. In a vehicle train, a first vehicle unit and a second vehicle unit, the vehicle units having upper loading planes and longitudinal center planes perpendicular to the loading planes and adjacent ends, a lower cross lever operatively mounted for pivoting on the second vehicle unit about an axis in its center plane and intersecting its loading plane at complementary acute and oblique angles, and means operatively connecting the cross lever with the adjacent end of the first vehicle unit.

12. In a vehicle train, a first vehicle unit and a second vehicle unit having loading planes and adjacent ends, two laterally spaced sets of separable interfitting opposite parts abuttable and pivotal against each other on the adjacent ends of the units, and means operatively connecting the units for turning with respect to each other on either set of interfitting parts as a pivot, the connecting means including rigid bar means upwardly and downwardly inclined with respect to the loading planes and between the adjacent ends of the units, the bar means having upper and lower ends, and upper and lower means connecting the upper and lower ends of the inclined rigid bar means between the units for swinging with respect to each other and each unit when the units turn with respect to each other.

13. In a vehicle train, a first vehicle unit and a second vehicle unit having loading planes and adjacent ends, two laterally spaced sets of separable interfitting opposite parts abuttable and pivotal against each other on the adjacent ends of the units, each set of interfitting parts including an abutment and pivot member having an outwardly opening groove on one of the adjacent unit ends and an abutment and pivot bar on the other adjacent unit end, and means operatively connecting the units for turning with respect to each other on either set of interfitting parts as a pivot, the connecting means including rigid bar means upwardly and downwardly inclined with respect to the loading planes and between the adjacent ends of the units, the bar means having upper and lower ends, and upper and lower means connecting the upper and lower ends of the inclined rigid bar means between the units for swinging with respect to each other and each unit when the units turn with respect to each other.

14. In a vehicle train, a first vehicle unit and a second vehicle unit, the vehicle units having upper loading planes and longitudinal center planes perpendicular to the loading planes and adjacent ends, and means operatively connecting the adjacent ends of the vehicle units for alternate lateral turning of the units with respect to each other about axes on opposite sides of the center planes and between the connected ends, the connecting means including laterally spaced rigid inclined members on opposite sides of the center planes, the inclined members having upper ends adjacent the first vehicle unit and lower ends adjacent the second vehicle unit, a cross lever operatively mounted on the second vehicle unit for pivoting about an axis in its center plane and intersecting its loading plane, bendable and twistable joint means connecting the upper end of each inclined member with the first vehicle unit, and bendable and twistable joint means connecting the lower end of each inclined member with the cross lever on the second vehicle unit at one side of the center planes.

OTTO I. OYLER.